US005692391A

United States Patent [19]
Joslin, Jr.

[11] Patent Number: 5,692,391
[45] Date of Patent: *Dec. 2, 1997

[54] SELF CHILLING BEVERAGE CONTAINER

[75] Inventor: William Daniel Joslin, Jr., San Juan Capistrano, Calif.

[73] Assignee: The Joseph Company, Laguna Niguel, Calif.

[*] Notice: The term of this patent shall not extend beyond the expiration date of Pat. No. 5,606,866.

[21] Appl. No.: 596,839

[22] Filed: Feb. 5, 1996

Related U.S. Application Data

[63] Continuation-in-part of Ser. No. 448,732, May 24, 1995.
[51] Int. Cl.6 .................. F25D 3/10; F25B 9/02
[52] U.S. Cl. .................. 62/293; 62/371; 62/114
[58] Field of Search .................. 62/114, 293, 294, 62/371, 457.4; 252/67

[56] References Cited

U.S. PATENT DOCUMENTS

| 3,494,143 | 2/1970 | Barnett et al. | 62/294 |
| 4,482,465 | 11/1984 | Gray | 252/67 |
| 4,688,395 | 8/1987 | Holcomb | 62/294 |
| 5,325,680 | 7/1994 | Baroso-Lugan et al. | 62/294 |
| 5,331,817 | 7/1994 | Anthony | 62/5 |

FOREIGN PATENT DOCUMENTS

| 3758 | 1/1977 | Japan | 62/294 |

*Primary Examiner*—William Doerrler
*Attorney, Agent, or Firm*—Robbins, Berliner & Carson, LLP.

[57] ABSTRACT

A disposable beverage container including a heat exchange unit which, when activated, releases a refrigerant and cools the beverage. The heat exchange unit contains the refrigerant and includes a valve for controllably releasing the same. The refrigerant is a mixture of at least one liquified petroleum gas having a pressure profile of 70 psi at 70° F. and a halogen gas.

6 Claims, 6 Drawing Sheets

1

SELF CHILLING BEVERAGE CONTAINER

BACKGROUND OF THE INVENTION

Field of the Invention

This application is a continuation-in-part application of Ser. No. 08/448732 filed May 24, 1995 for Heat Exchange Unit for Self Cooling Beverage Containers.

This invention relates to a portable and disposable unit for cooling a beverage.

A wide variety of units have been proposed in the patent literature for cooling a beverage and, more particularly, for cooling a beverage contained in a disposable can. However, these devices have not been commercially successful. One reason they have not been successful is that they have not been compatible with conventional bottling methodology. In many instances, they require the use of specially designed beverage cans and, as a result, specially designed bottling or canning is required.

SUMMARY OF THE INVENTION

The present invention provides a heat exchange unit which can be inserted into a beverage can on the bottling line and which can be actuated by the pressure differential which occurs in the can when the can is opened. As will become clear from the detailed description below, various embodiments of heat exchangers are provided in which the heat exchange unit can be used without modifying the construction of the conventional beverage can. The conventional can lid and bottom can be used. Hence, the production of canned beverages having a self-chilling capability can be easily integrated with the production of conventional canned beverages without any disruption or modification to the bottling or canning line.

In accordance with a first aspect of the invention, we provide a portable heat exchange unit for cooling a medium comprising: a vessel adapted to contain a discrete quantity of a compressed or liquified gas, the vessel including a wall arranged to be placed in contact with the medium to be cooled; a valve for operatively controlling the release of said gas from the vessel; a panel positioned adjacent and inside the wall of the vessel for operatively directing the gas into heat exchange contact with the wall of the vessel and arranged to release gas; and a means for exhausting the gas from the vessel.

In a preferred embodiment, the heat exchange unit provides efficient heat transfer through the use of a ridged panel which is situated in the heat exchange unit so as to form channels between the panel and the wall of the unit which direct vaporized gas up the sides of the heat exchange unit canister.

In one embodiment, the gas cools the unit by flowing through channels formed by a panel member, which adjoins the inside wall of a first chamber in the unit and evaporating. The liquified gas travels up the channels by the physical action of the boiling gas. As the gas rises up the channels, it absorbs heat from the beverage through the wall of the first chamber. By selecting a material for the panel which is wettable by a liquified gas, extremely efficient heat transfer occurs from the medium being cooled to the gas. Once the gas has been warmed by the heat transfer, it is exhausted from the container.

BRIEF DESCRIPTION OF THE DRAWINGS

The invention is hereinafter more particularly described by way of example only with reference to the accompanying drawings, in which.

DETAILED DESCRIPTION

Figure 1:
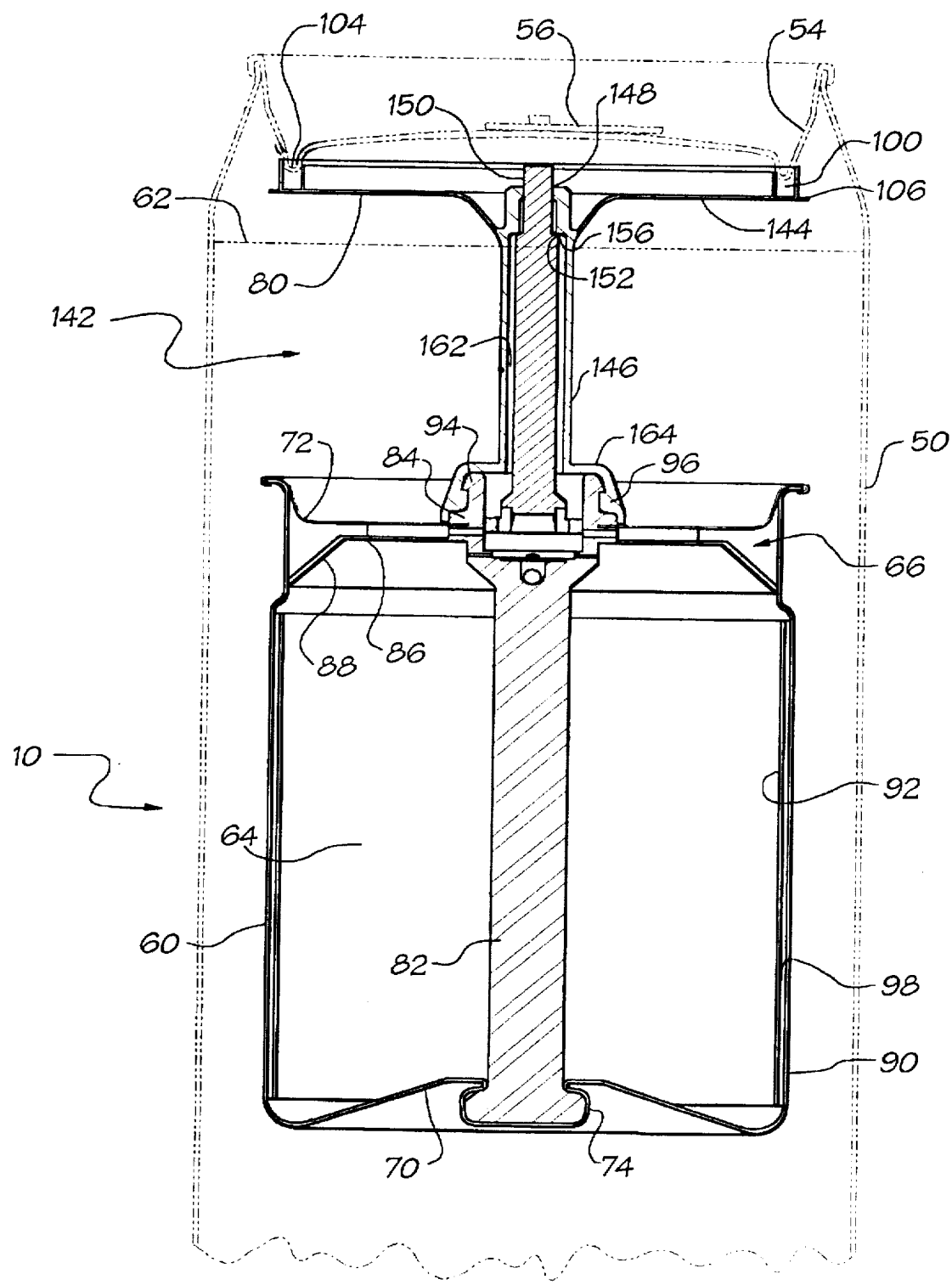
FIG. 1 is a cross-sectional illustration of a self-chilling beverage container in a deactivated condition.

FIG. 1 illustrates a beverage container of the type that may be used to contain beverages such as beer, soda, fruit juices and the like. The can 50 includes a lid 54 which includes a conventional pull top 56 capable of opening a hole in lid 54 for drinking in a convention manner. The lid 54 conventionally includes an annular ridge 104 therein.

The beverage can 50 includes a heat exchange unit 10 which is immersed in the beverage 62 in the can 50. The heat exchange unit includes a canister subassembly 60 and an actuator subassembly 142 which snap together at flanges 94 and 96 as described herein. Canister 60 contains a gas (not shown) which is employed to cool the beverage 62 and is contained under pressure in a compressed or liquified state. Canister 60 includes a base 70, an integral lid 72 and a wall 90.

Figure 4A:
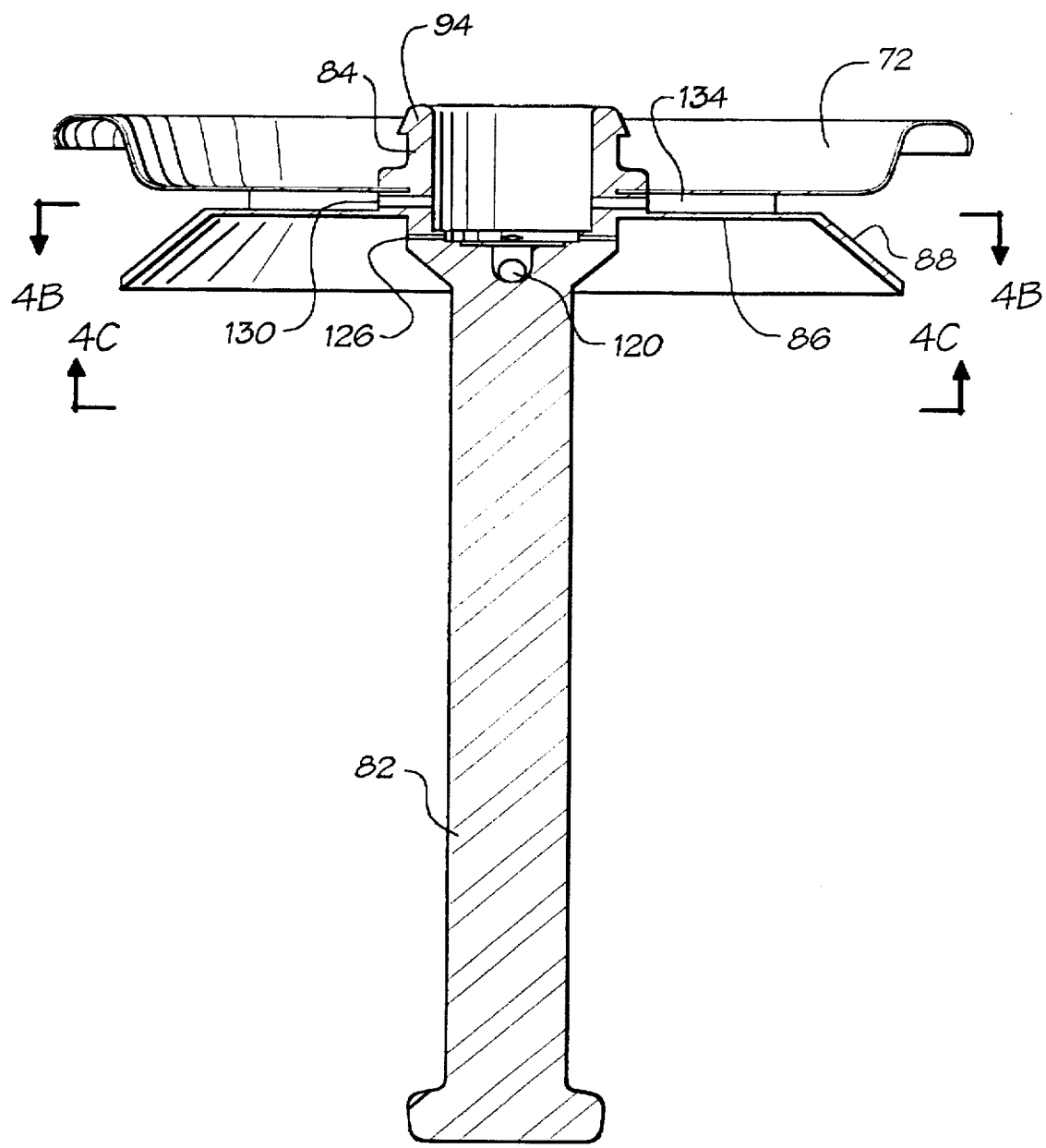
FIG. 4A is a cross-sectional view of the center post of the heat exchange unit.

As seen in FIG. 1, post 82 is captured in recess 74 in base 70 of canister 60 by means of a friction or snap fit or by being thermoplastic and heated such that when it is inserted into the recess 74 in the base, it conforms to the shape of recess 74. Post 82 reinforces the canister 60 when it is under pressure and prevents base 70 and lid 72 from being outwardly deformed by the pressure in the unit. Hub 84, which is hollow and cylindrical, extends upwardly from post 82. Around its outer surface, hub 84 includes a flange 94 for receiving flange 96 of annular rim 164 in a snap fit as explained later. Disc 86, which is shown in FIG. 4A, extends radially from hub 84 and includes an annular flanged portion 88. As shown in FIG. 4C, post 82 also includes a plurality of apertures 120 which are connected by tubes 122 to apertures 75 in disc 86.

Figure 4B:
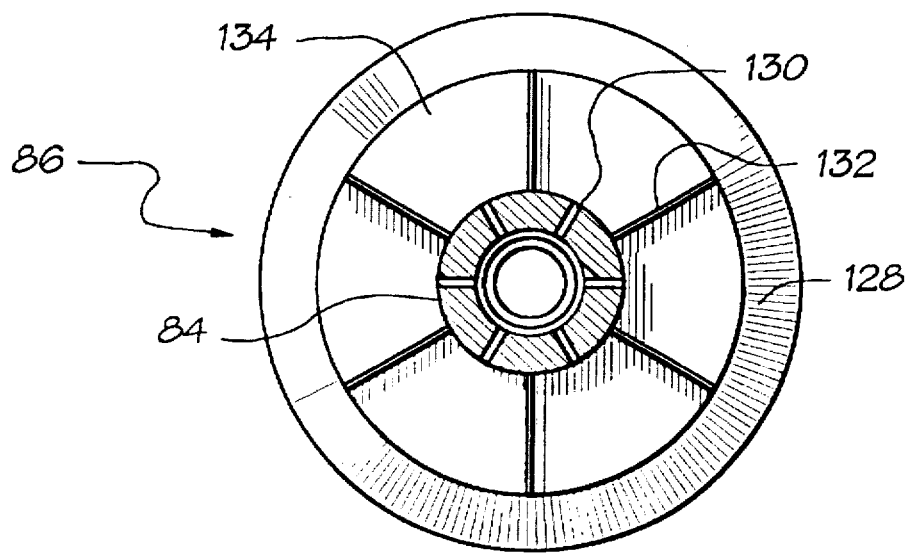
FIG. 4B is a view of the center post of the heat exchange unit along line 4B—4B.
Figure 4C:
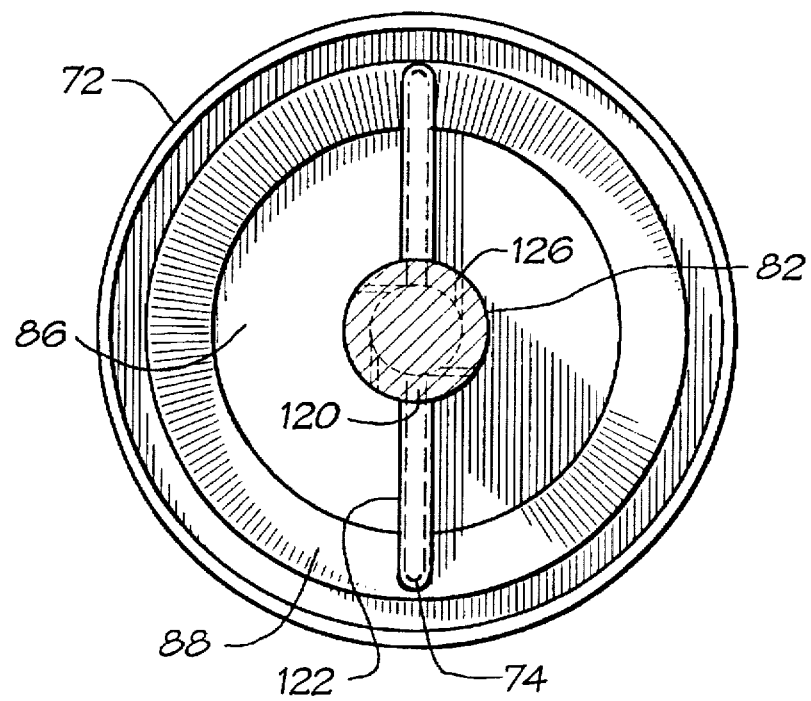
FIG. 4C is a view of the center post of the heat exchange unit along 4C—4C.

As shown in FIG. 4B, disc 86 has a plurality of ridges 132 on its upper surface. These ridges 132, when in contact with lid 72, form compartments 134 which provide for increased heat exchange contact between the heat exchange unit and the beverage. A plurality of channels 130 in hub 84 provide a means of communication between areas 134 and passage 162.

Canister 60 of heat exchange unit 10 is divided into a first heat exchange chamber 64 and a second heat exchange chamber 66. Base 70, disc 86 and wall 90 form first heat exchange chamber 64. Chamber 64, along the inside of wall 90, includes panel 92 which preferably includes ridges 192 thereon. Ridges 192 form a plurality of channels 98 along the inside surface of wall 90. Lid 72, flanged portion 88 of disc 86, and wall 90 form second heat exchange chamber 66. This second heat exchange chamber 66 communicates with compartments 134 to provide a second section of the heat exchange unit 10 in which the gas can exchange heat with the medium to be cooled.

Figure 3A:
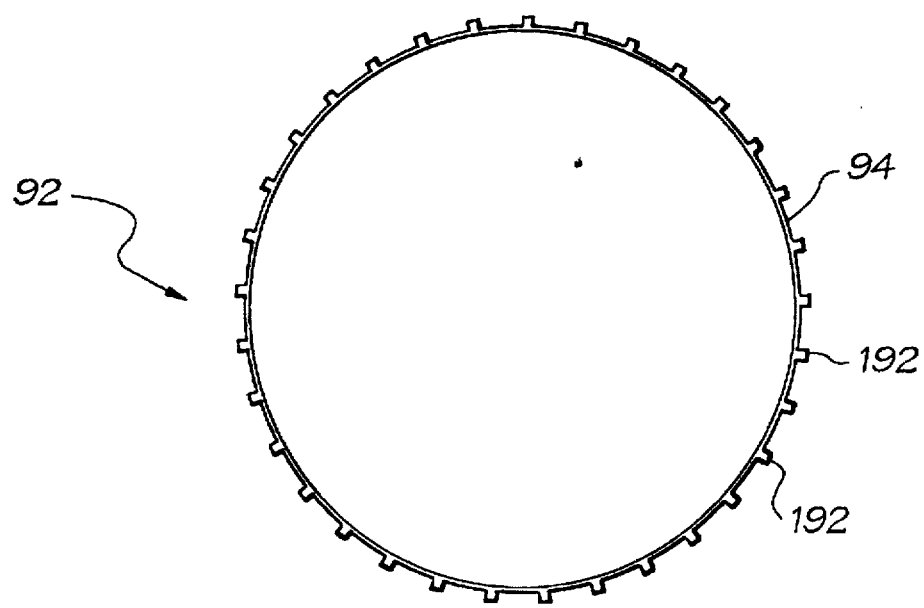
FIG. 3A is a top view of the panel which lines the inside of the heat exchange unit.
Figure 3B:
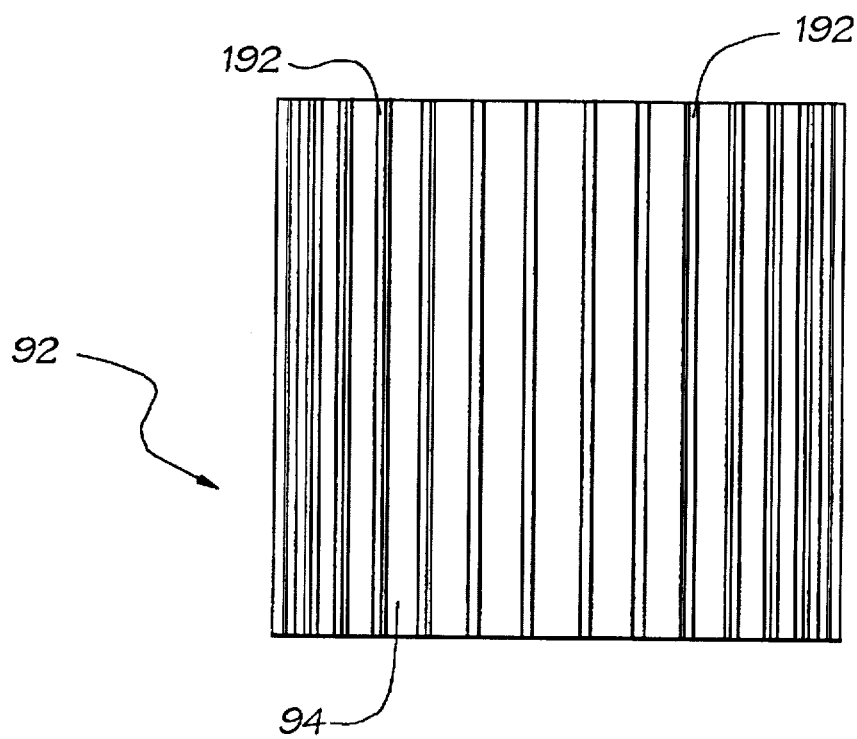
FIG. 3B is a side view of the panel which lines the inside of the heat exchange unit.

Panel 92, which surrounds the inside circumference of wall 90, can be formed from polypropylene, polyester, or polycarbonate, with polyester being preferred. In a preferred embodiment, panel 92 is formed of a material which is capable of being wetted by the liquified gas. As seen in FIGS. 3A and 3B, panel 92 includes a plurality of ridges 192 spaced along wall 94. These ridges 192 are spaced apart from each other by approximately 10° measured from the center of one ridge to the next and these ridges, along with walls 90 and 94, form a plurality of channels 98. Each ridge extends from wall 94 approximately 0.02 inch (0.51 mm) and is approximately 0.02 inch (0.51 mm) in width. Typically, panel 92 is approximately 2.23 inches (56.6 mm) in height and has a length sufficient to engage the entire inside circumference of canister 60. one skilled in the art will appreciate that the dimensions of ridges 192 and channels 98 will vary depending on the size of the heat exchange unit in which the panel 92 is used. Dimensions will vary in the size of the can the unit is designed to cool. Although channels 98 are illustrated as running perpendicular to base 70 of chamber 64, one skilled in the art will appreciate that channels 98 could spiral or take any path which would provide for effective cooling of beverage 62 in can 50.

Figure 2:
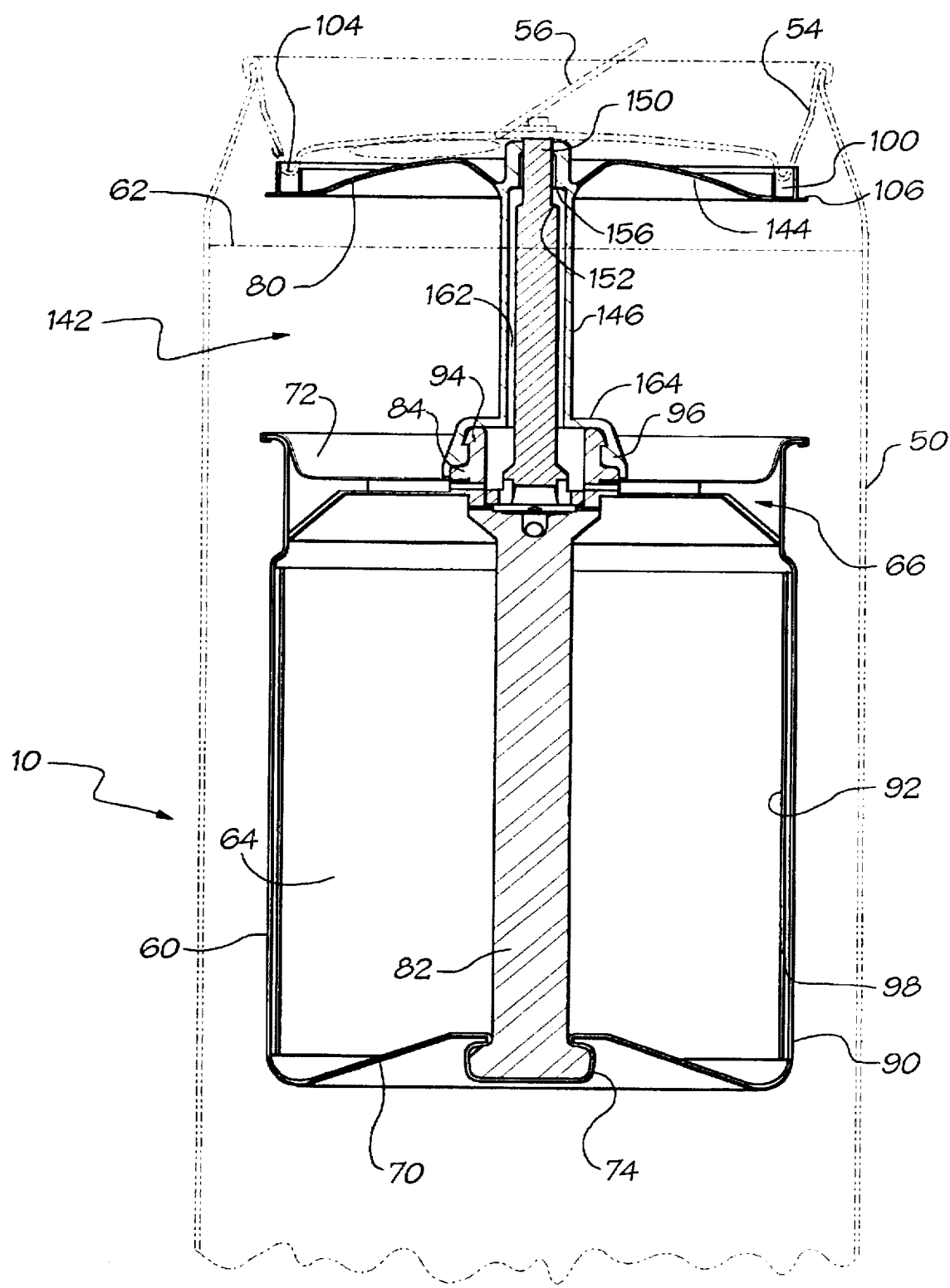
FIG. 2 is a cross-sectional illustration of the beverage container in an activated condition.
Figure 5:
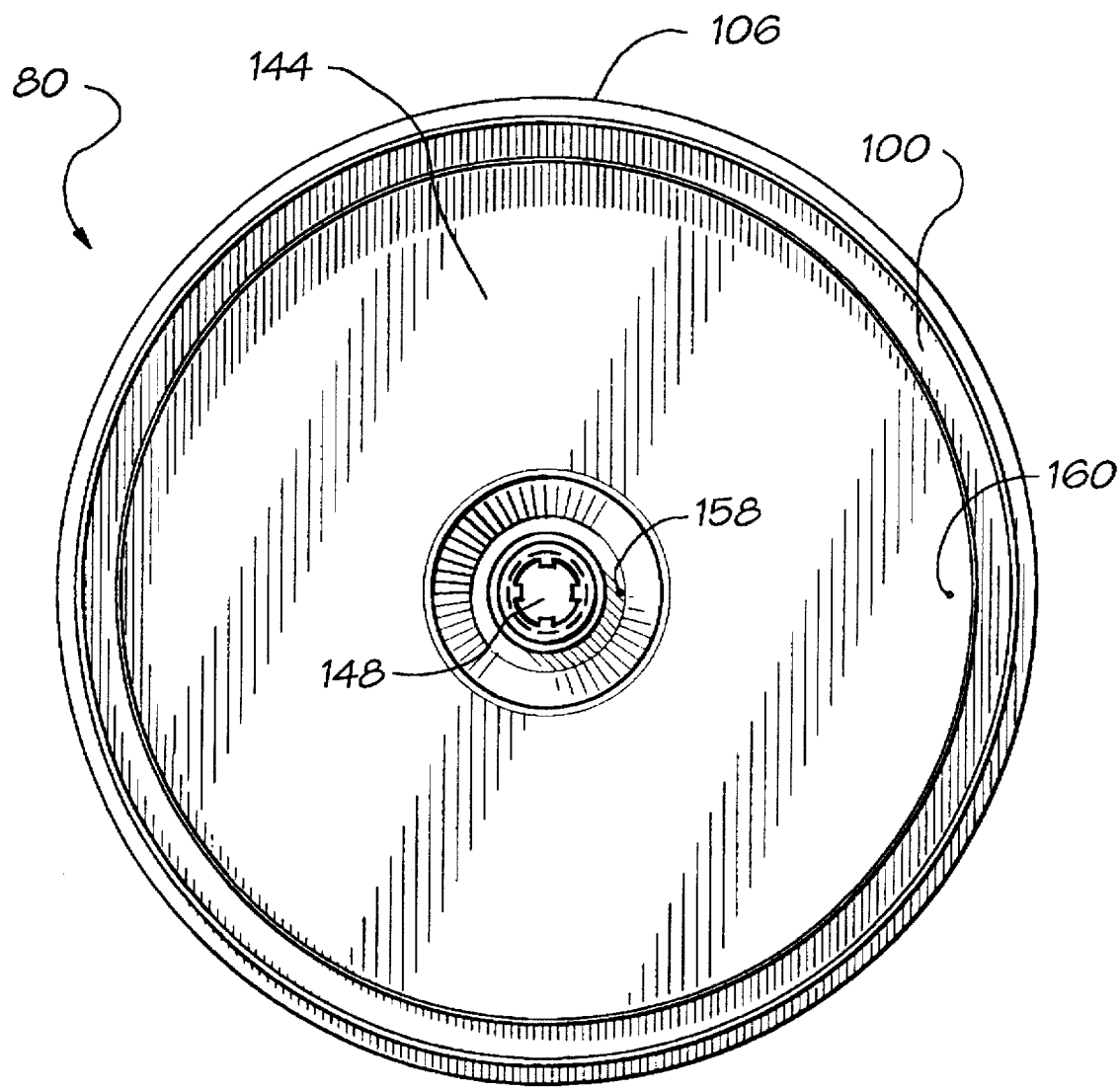
FIG. 5 is a top view of the exhaust port of this invention.

As shown in FIGS. 1 and 2, actuator subassembly 142 includes annular panel 80, groove 100, panel 144, an integral tubular base 146 and actuator 150. Tubular base 146 expands radially into an annular rim 164 having a flange 96 for capturing the flange 94 in a snap fit. Base 146 includes a channel 162 which runs the length of base 146. Actuator 150 extends through base 146 and extends from subassembly 142 through aperture 148 in annular panel 80. Aperture 148 may be hexagonal and actuator 150 may be circular in cross-section to provide access for ventilation of the unit 10, as described below. Annular panel 80 and membrane 144 are circular and annular panel 80 includes groove 100 around its outer periphery. Flange 106 extends from the outside of groove 100. Actuator 150 includes a shoulder 152 which engages a shoulder 156 in base 146 to seal channel 162 when the unit is in an inactive condition. As seen in FIG. 5, annular panel 80 also includes aperture 158 and aperture 160.

To provide for a floating unit, the unit 10 may be formed of any plastics used to blow mould or injection mould parts. Plastics such as polycarbonate, polyethylene, and polyester have been found to be useful and polyester has been found to be particularly useful. Canister 60 may be formed from aluminum or plastics. However, aluminum is preferred because of its superior heat transfer characteristics.

The heat exchange unit 10 is also designed so that it can be placed into a standard beverage can 50 during the canning process. After the unit 10 has been inserted into the beverage can 50, the beverage can 50 is filled with beverage 62. Once the can 50 has been filled with beverage 62, lid 54 is positioned on can 50 and seamed into position. In a typical canning process for carbonated and non-carbonated beverages, before can 50 is sealed, a shot of an inert gas such as nitrogen is injected into can 50 to pressurize can 50. The assembled heat exchange unit 10 is designed such that when can 50 is filled with beverage 62, the heat exchange unit 10 floats toward the top of can 50 and is prevented by flange 106 from protruding from can 50. In a sealed can, the pressure of beverage 62 slowly increases due to a release of nitrogen pressure and/or carbonation within the body of beverage 62. The unit 10, guided by the shape of can 50 and more particularly the frustoconical mouth portion of the can, floats upwardly and groove 100 on the unit engages ridge 104 on the can. Apertures 158 and 160 are provided in annular panel 80 to allow the nitrogen gas or carbonation to escape so that the unit is not activated as it attaches to lid 52 of can 50. Apertures 158 and 160 are dimensioned such that they will allow the pressure in can 50 to equilibrate during the filling process but do not allow the pressure in can 50 to equilibrate during the activation process.

Annular panel 80 encompasses the tab area of the can 50. The density of the unit 10 is approximately equal to that of the beverage 62 so that the unit 10 will not easily dislodge from lid 52 while can 50 is in a sealed condition. Annular panel 80 prevents the beverage 62 from flowing from the can 50 when the can 50 is in the sealed inactive condition, unless the pressure of beverage 62 is reduced to atmospheric pressure causing annular panel 80 to release from lid 54, as described below. When the can 50 is opened and the seal is broken, annular panel 80 releases from the lid 54 of can 50 after the unit 10 has cooled the beverage 62, as described below, allowing beverage 62 to be poured from the can 50.

To activate the heat exchange unit 10, the can 50 is opened by means of pulltop 56 in lid 54. Upon opening the can 50, a pressure differential is created between the space above membrane 144, which attains atmospheric pressure, and the body of beverage 62. The pressure differential between beverage 62 and the atmospheric pressure in the space above membrane 144 forces the unit 10 toward lid 54 of the can 50 causing actuator 150 to be depressed when it contacts lid 54. This pressure differential results from the beverage having a pressure of approximately 20-30 p.s.i. (1.37895 to $2.068425 \times 10^5 N/m^2$ and atmospheric pressure being approximately 14 p.s.i. ($9.65265 \times 10^4 N/m^2$) As seen in FIG. 2, the upward motion of the unit 10 causes membrane 144 to flex upwardly. As stated above, apertures 158 and 160 are not large enough to allow the pressure above and below annular panel 80 to equilibrate and prevent activation of the heat exchange unit 10. Actuator 150 is pushed toward area 78 by contact with lid 54 of can 50. As actuator 150 moves toward area 78, passage 162 is opened as shoulder 152 of actuator 150 moves away from shoulder 156 in base 146 of annular panel 80. Once passage 162 is opened, the gas has a route to escape from the unit 10 and, thus, the unit 10 becomes activated.

Once the unit 10 has been activated, the pressure on the gas in canister 60 decreases which causes the gas to boil. This boiling action causes the liquified gas to flow into the bottom of channels 98. The first point of heat transfer between beverage 62 and the liquefied gas occurs within the channels 98. Heat from the beverage 62 is absorbed by the gas through wall 90 of canister 60 as the gas vaporizes by means of adiabatic expansion. As the temperature of the gas increases, the liquefied gas begins to boil within the channels 98. This boiling action propels the liquefied gas upward through channels 98. Further exposure of the upward flowing gas to the heat exchange surface of chamber 64 causes the gas to boil off. This progressive boiling and propagation of the liquified gas insures that the entire interior surface of wall 90 and base 70 of canister 60 are bathed with cooling gas. This method considerably increases the heat exchange efficiency of unit 10.

After the gas has flowed up and through channels 98, it is exhausted from the unit 10. The gas flows from channels 98 into the space vacated by the liquified gas in chamber 64. The gas then flows into channels 126 and into area 78. The gas exits area 78 and flows through apertures 158 in the base of actuator 150 into channel 162. It is then exhausted from channel 162 through the slots in aperture 148. The gas then flows through lid 54 of the can 50 by means of the opening created by pull top 56.

After the cycle of evaporation and heat exchange is completed, the pressure of beverage 62 will normalize to atmospheric pressure. As the pressure of beverage 62 decreases, the pressure differential between beverage 62 and the area above membrane 144 correspondingly decreases. Eventually, the pressure differential will no longer exceed the pressure required to maintain membrane 144 in a flexed position. The heat exchange unit 10 is then pushed away from lid 54 by the recoiling of membrane 144 of annular panel 80 to its original, flat condition. Once the heat exchange unit 10 has moved away from the lid 54 of the can 50, the beverage 62 can then be poured from the can 50 for consumption. Because the heat exchange unit 10 is constructed of a material which will float in the beverage 62 and the gas originally in the can is exhausted, the heat exchange unit 10 floats toward the bottom of the can 50 as the beverage is tilted into position for pouring beverage 62 from the can 50 or for consuming the beverage 62 directly from the can 50. Thus, the flow of beverage 62 from the can 50 is not obstructed by the unit 10 during pouring or drinking.

It is recognized by those skilled in the art that the use of fluorocarbon compressed gas as the refrigerant in the HEU may create difficulties in some portions of the world from an environmental perspective. It is also known to those skilled in the art that liquified petroleum gases may also be utilized as a refrigerant. However, such liquified petroleum gases are flammable and thus create a potential hazard depending upon the manner in which they are exhausted from the HEU. To combat the problems above referred to it has been found that a mixture of liquified petroleum gases along with a fluorocarbon gas renders the refrigerant more environmentally acceptable and also substantially mitigates the flammability problem. In a preferred embodiment of the refrigerant in accordance with the principles of the present invention, the HEU contains a mixture of liquified petroleum gases have a pressure profile of 70 psi at 70° F. and a fluorocarbon gas.

The liquified petroleum gases which have been found to be useful in the mixture to form the refrigerant in accordance with the present invention are methane, ethane, propane, isobutane, N-butane, isopentane, N-pentane and dimethyl ether. The fluorocarbon gases which may be utilized in accordance with the principles of the present invention are: tetrafluoroethane, difluoroethane, fluorotrichloromethane, dichloromethane, difluoromethane, chlorodifluoromethane.

Preferably at least two of the liquified petroleum gases are mixed together and the combination of those two gases is then mixed with the fluorocarbon gas. As one preferred example, isobutane and propane are mixed together in a proportion of 58% isobutane and 42% propane by weight and this mixture is then combined with tetrofluoroethane with the mixture of isobutane and propane being between 30% and 40% by volume of the total mixture with the balance being tetrafluoroethane.

One skilled in the art will also appreciate that this invention is not limited for use with carbonated beverages and that it can also be used with uncarbonated beverages. As stated above, it is common practice to can uncarbonated beverages with nitrogen pressure. Nitrogen can be used to provide enough pressure to allow the unit 10 to form an effective seal with ridge 104 and to activate the unit 10. Thus, uncarbonated beverages can be canned under pressure in practice of this invention. Where a pressure differential activates the heat exchange unit 10, the beverage 62 must be packed under some degree of pressure from nitrogen or some other inert gas to function properly.

We claim:

1. A container for a food or beverage comprising:
   A. a first vessel adapted to contain food or beverage,
   B. a heat exchange unit including a second vessel containing a discreet quantity of a refrigerant, the second vessel comprising:
      1. a wall and heat conducting contact with the food and beverage;
      2. a panel positioned adjacent and inside the wall of the vessel for increasing the effective heat transfer of the wall, wherein the panel has ridges thereon and engages the wall so as to form a plurality of channels between the ridges and the wall; and
      3. means for controlling the release of the gas from the second vessel to cool said food or beverage in said container;
   C. the refrigerant in the second vessel comprises a mixture of at least one liquified petroleum gas having a pressure profile of 70 psi at 70° F. and a halogen gas.

2. A container as defined in claim 1 wherein said halogen gas is selected from the group consisting of chlorodifluoromethane, difluoromethane, dichlormethane, fluorotrichloromethane, difluoroethane and tetrafluoroethane.

3. The container as defined in claim 1 wherein said liquified petroleum gas comprises a mixture of at least two liquified petroleum gases.

4. The container as defined in claim 3 wherein said mixture of at least two liquified petroleum gases is selected from the group consisting of methane, ethane, propane, isobutane, N-butane, isopentane, N-pentane and dimethyl ether.

5. The container as defined in claim 4 wherein the ratio of the mixture of liquified petroleum gas to halogen gas is between 1% to 30% liquified petroleum gas and 70% to 99% of said halogen gas.

6. A container as defined in claim 5 wherein said liquified petroleum gas is a mixture containing 58% isobutane and 42% propane by volume.

\* \* \* \* \*